US012542370B2

(12) United States Patent
Qamar et al.

(10) Patent No.: US 12,542,370 B2
(45) Date of Patent: Feb. 3, 2026

(54) ANTENNAS HAVING RF LENSES THAT INCLUDE META-STRUCTURES THAT FORM STEP APPROXIMATIONS OF LUNEBURG LENSES AND RELATED RF LENSES

(71) Applicant: Outdoor Wireless Networks LLC, Claremont, NC (US)

(72) Inventors: Zeeshan Qamar, Richardson, TX (US); Bo Wu, Allen, TX (US); Chengcheng Tang, Murphy, TX (US)

(73) Assignee: Outdoor Wireless Networks LLC, Richardson, TX (US)

(*) Notice: Subject to any disclaimer, the term of this patent is extended or adjusted under 35 U.S.C. 154(b) by 42 days.

(21) Appl. No.: 18/769,825

(22) Filed: Jul. 11, 2024

(65) Prior Publication Data

US 2025/0030171 A1 Jan. 23, 2025

Related U.S. Application Data

(60) Provisional application No. 63/527,127, filed on Jul. 17, 2023.

(51) Int. Cl.
*H01Q 15/10* (2006.01)
*H01Q 21/06* (2006.01)

(52) U.S. Cl.
CPC ........... *H01Q 15/10* (2013.01); *H01Q 21/061* (2013.01)

(58) Field of Classification Search
USPC ........................................................... 343/753
See application file for complete search history.

(56) References Cited

U.S. PATENT DOCUMENTS

2023/0170611 A1* 6/2023 Chisum ................ H01Q 19/062 343/755
2025/0141115 A1* 5/2025 Hao ....................... H01Q 19/06

FOREIGN PATENT DOCUMENTS

CN 110098490 A * 8/2019 ............. H01Q 21/24

* cited by examiner

*Primary Examiner* — Crystal L Hammond
*Assistant Examiner* — Brandon Sean Woods
(74) *Attorney, Agent, or Firm* — Myers Bigel, P.A.

(57) ABSTRACT

An RF lens comprises a multilayer printed circuit board that comprises a plurality of dielectric layers and a plurality of metallization layers that are alternatingly stacked, the plurality of metallization layers including at least a first metallization layer and a second metallization layer. Each metallization layer comprises a plurality of meta-structures. The meta-structures are arranged to form a step approximation of a Luneburg lens in at least one direction.

20 Claims, 10 Drawing Sheets

ANTENNAS HAVING RF LENSES THAT INCLUDE META-STRUCTURES THAT FORM STEP APPROXIMATIONS OF LUNEBURG LENSES AND RELATED RF LENSES

CROSS-REFERENCE TO RELATED APPLICATION

The present application claims priority under 35 U.S.C. § 119 to U.S. Provisional Patent Application Ser. No. 63/527,127, filed Jul. 17, 2023, the entire content of which is incorporated herein by reference.

FIELD

The present invention generally relates to wireless communications and, more particularly, to lensed antennas for use in wireless communications systems and related RF lenses.

BACKGROUND

Wireless communications systems are well known in the art. In a wireless communications system, a radio is used to convert baseband data into a radio frequency ("RF") signal that is transmitted into free space through an antenna. The antenna may be designed to focus the RF energy in desired directions. This focusing of the RF energy increases the magnitude of the desired signal relative to the background noise, thereby improving the signal-to-noise ratio, which allows for higher throughput communications and/or improved signal quality. Antennas can focus RF energy in a variety of different ways. For example, in some cases, antennas (e.g., large diameter parabolic reflector antennas) may be used that have large apertures which act to focus the RF energy. Phased arrays of antenna elements may also be used where the individual radiating elements in the array have relatively small apertures, but the RF signals that are fed to the individual radiating elements are phased so that the "element" antenna beams generated by each individual radiating element constructively combine to form a more focused composite antenna beam.

RF lenses provide another technique for focusing the RF energy emitted by a radiating element or an array of radiating elements. An RF lens refers to a structure that is designed to focus RF energy that is incident thereto. RF lenses operate in a manner similar to optical lenses. The amount of focusing performed by an RF lens is a function of, among other things, the effective dielectric constant of the RF lens. Generally speaking, the higher the effective dielectric constant, the greater the amount of focusing of the RF energy incident to the RF lens.

An RF lens may be a homogeneous structure with a single dielectric constant or a heterogeneous structure with an effective dielectric constant that varies throughout the lens. RF lenses having a homogeneous structure are easier to manufacture, but are less effective at focusing the RF energy. Spherical, cylindrical, ellipsoidal and flat RF lenses are known in the art. For example, U.S. Pat. No. 10,418,716 discusses base station antennas having cylindrical, spherical and ellipsoidal RF lenses, and Angela Demetriadou and Yang Hao, *Slim Luneburg Lenses for Antenna Applications*, Optics Express, Vol. 19, No. 21, Oct. 10, 2011 discusses various flat RF lenses. Cylindrical RF lenses typically are designed to focus the RF energy in one plane, while spherical and ellipsoidal RF lenses are designed to focus the RF energy in two orthogonal planes. Spherical and cylindrical RF lenses often provide a high degree of focusing. However, in many applications, the use of spherical or cylindrical RF lenses may significantly increase the size, weight and cost of the antenna.

A variety of different RF energy focusing materials may be used to form an RF lens. Preferably, the dielectric materials will be lightweight, inexpensive, and thermally stable (since the RF energy passing through an RF lens will act to heat the dielectric material of the lens). Various lightweight dielectric materials such as polystyrene, expanded polystyrene, polyethylene, polypropylene, or expanded polypropylene are commercially available that may be used to focus RF energy incident thereto. These materials, however, tend to have relatively low dielectric constants, which limits that amount of focusing that occurs. So-called "artificial" dielectric materials that include conductive materials dispersed within a dielectric base material to provide a composite material having electromagnetic properties similar to those of high dielectric constant dielectric materials have been proposed for use in RF lenses because such materials may have lower weight and/or lower cost than conventional dielectric materials having a similar dielectric constant. U.S. Patent Publication No. 2018/0166789, filed Jan. 29, 2018, the entire content of which is incorporated herein by reference, describes a wide variety of suitable artificial dielectric materials which may alternatively be used.

As noted above, many RF lens have a homogeneous structure with a single dielectric constant throughout the lens. The Luneburg lens is a known type of RF lens that has a variable dielectric constant. In particular, a Luneburg lens includes multiple layers of dielectric material where each layer has a different dielectric constant. The dielectric materials in the layers closest to the center of the lens have higher dielectric constants, while the dielectric materials in the layers farther from the center of the lens have steadily decreasing dielectric constants. An "ideal" spherical Luneburg lens has a continuously varying dielectric constant throughout the lens that conforms to the following formula:

$$Dk = 2*\left[1-\left(r/R\right)^2\right] \qquad (1)$$

where Dk is the dielectric constant, R is the radius of the Luneburg lens and r is a particular location along the radius R. FIG. 1 is a graph that illustrates the square root of the dielectric constant as a function of the relative radius (r/R) of an ideal spherical Luneburg lens. Each point on the surface of an ideal Luneburg lens is the focal point for parallel radiation incident on the opposite side. This ensures that no reflection occurs at the surface of the lens. Within a conventional spherical Luneburg lens, the RF radiation travels along elliptical paths through the lens. The applications for a conventional Luneburg lens, however, may be limited due to its spherical aperture, as the lens can hardly accommodate flat feeding sources used in practical applications. Furthermore, conventional spherical Luneburg lens are difficult to fabricate.

SUMMARY

Pursuant to certain embodiments of the present invention, RF lens are provided that comprise a multilayer printed circuit board that comprises a plurality of dielectric layers and a plurality of metallization layers that are alternatingly stacked, the plurality of metallization layers including at least a first metallization layer and a second metallization layer. Each metallization layer comprises a plurality of meta-structures. The meta-structures are arranged to form a step approximation of a Luneburg lens in at least one direction.

In some embodiments, the RF lens is a step approximation of a Luneburg lens in each of three orthogonal directions. In some embodiments, the step approximation is at least a three step approximation.

In some embodiments, the meta-structures included in the first metallization layer all have the same shape. In some embodiments, at least some of the meta-structures included in the first metallization layer have different sizes than other of the meta-structures included in the first metallization layer. In some embodiments, the first metallization layer is an interior one of the plurality of metallization layers.

In some embodiments, a metallization layer of the plurality of metallization layers that is closest to being in the middle of the alternating stacked plurality of dielectric layers and plurality of metallization layers includes a meta-structure that is at least as large as any of the meta-structures included in the plurality of metallization layers.

In some embodiments, outer ones of the metallization layers in the plurality of metallization layers include meta-structures that are at least as small as any of the meta-structures included in the plurality of metallization layers.

In some embodiments, the first metallization layer is an interior one of the plurality of metallization layers, and wherein meta-structures extending around the periphery of the first metallization layer are smaller than meta-structures in a center of the first metallization layer.

In some embodiments, each meta-structure has a closed perimeter. In some embodiments, each meta-structure has an open interior. In some embodiments, each meta-structure has a circular ring shape.

In some embodiments, an effective dielectric constant of the RF lens decreases in step fashion with increasing distance from a center of the RF lens.

In some embodiments, each metallization layer in the plurality of metallization layers includes a plurality of unit cells, and each unit cell in each metallization layer is spaced apart from adjacent unit cells in the respective metallization layers by a same distance.

In some embodiments, any of the above-discussed RF lenses may be part of an antenna. The antenna may further include an array that includes a plurality of radiating elements that are configured to transmit respective sub-components of a first RF signal. The RF lens may be positioned to receive electromagnetic radiation from at least some of the radiating elements in the array. In some embodiments, the plurality of radiating elements may be arranged in a plurality of columns and a plurality of rows. In some embodiments, a first footprint of the RF lens may be smaller than a second footprint of the array.

Pursuant to further embodiments of the present invention, RF lenses are provided that comprise a dielectric block and a plurality of layers of conductive meta-structures embedded within the dielectric block, the plurality of conductive meta-structure layers including at least a first conductive meta-structure layer and a second conductive meta-structure layer. The meta-structures are arranged to form a step approximation of a Luneburg lens in at least one direction.

In some embodiments, the RF lens is a step approximation of a Luneburg lens in each of three orthogonal directions. In some embodiments, the step approximation is at least a three step approximation.

In some embodiments, the meta-structures included in the first conductive meta-structure layer all have the same shape. In some embodiments, at least some of the meta-structures included in the first conductive meta-structure layer have different sizes than other of the meta-structures included in the first conductive meta-structure layer. In some embodiments, the first conductive meta-structure layer is an interior one of the plurality of metallization layers. In some embodiments, the first conductive meta-structure layer is an interior one of the plurality of conductive meta-structure layers, and meta-structures extending around the periphery of the first conductive meta-structure layer are smaller than the meta-structures in a center of the first conductive meta-structure layer.

In some embodiments, each conductive meta-structure layer extends in a length and width direction, and the conductive meta-structure layers are stacked in a thickness direction that is perpendicular to the length and width directions, and a first average size of the meta-structures in one or two of the conductive meta-structure layers that are closest to a center of the dielectric block exceeds a second average size of the meta-structures that are outer ones of the conductive meta-structure layers. In some embodiments, at least some of the meta-structures included in the first conductive meta-structure layer are larger than other of the meta-structures included in the first conductive meta-structure layer in all three of a length direction, a width direction and a thickness direction.

In some embodiments, each meta-structure has a cross-shape.

In some embodiments, an effective dielectric constant of the RF lens decreases in step fashion with increasing distance from a center of the RF lens.

In some embodiments, each conductive meta-structure layer in the plurality of conductive meta-structure layers includes a plurality of unit cells, and each unit cell in each conductive meta-structure layer is spaced apart from adjacent unit cells in the respective conductive meta-structure layers by a same distance.

In some embodiments, any of the above-described RF lenses may be part of an antenna. The antenna may further include an array that includes a plurality of radiating elements that are configured to transmit respective sub-components of a first RF signal. The RF lens may be positioned to receive electromagnetic radiation from at least some of the radiating elements in the array. In some embodiments, the plurality of radiating elements are arranged in a plurality of columns and a plurality of rows. In some embodiments, a first footprint of the RF lens is smaller than a second footprint of the array.

Pursuant to further embodiments of the present invention, antennas are provided that comprise a two-dimensional array that includes at least two rows of radiating elements and at least two columns of radiating elements and a flat Luneburg lens positioned forwardly of the two-dimensional array and configured to receive RF radiation emitted by the two-dimensional array. The flat Luneburg lens only overlaps a central portion of the two-dimensional array.

In some embodiments, the flat Luneburg lens only overlaps less than two-thirds of the radiating elements in the two-dimensional array.

In some embodiments, the flat Luneburg lens only overlaps less than one-half of the radiating elements in the two-dimensional array. In other embodiments, the flat Luneburg lens only overlaps less than one-third of the radiating elements in the two-dimensional array.

In some embodiments, the flat Luneburg lens comprises a multilayer printed circuit board that includes a plurality of dielectric layers and a plurality of metallization layers that are alternatingly stacked, the plurality of metallization layers including at least a first metallization layer and a second metallization layer, wherein each metallization layer comprises a plurality of meta-structures, and the meta-structures are arranged to form a step approximation of a Luneburg lens in at least one direction. In some embodiments, the flat Luneburg lens is a step approximation of a Luneburg lens in each of three orthogonal directions.

In some embodiments, the meta-structures included in the first metallization layer all have the same shape and at least some of the meta-structures included in the first metallization layer have different sizes than other of the meta-structures included in the first metallization layer.

In some embodiments, each metallization layer in the plurality of metallization layers includes a plurality of unit cells, and each unit cell in each metallization layer is spaced apart from adjacent unit cells in the respective metallization layers by a same distance.

In some embodiments, the flat Luneburg lens comprises a dielectric block and a plurality of layers of conductive meta-structures embedded within the dielectric block, the plurality of conductive meta-structures including at least a first conductive meta-structure layer and a second conductive meta-structure layer. In such embodiments, the meta-structures are arranged to form a step approximation of a Luneburg lens in at least one direction.

In some embodiments, the flat Luneburg lens is a step approximation of a Luneburg lens in each of three orthogonal directions.

In some embodiments, the meta-structures included in the first conductive meta-structure layer all have the same shape and at least some of the meta-structures included in the first conductive meta-structure layer have different sizes than other of the meta-structures included in the first conductive meta-structure layer.

In some embodiments, each conductive meta-structure layer in the plurality of conductive meta-structure layers includes a plurality of unit cells, and each unit cell in each conductive meta-structure layer is spaced apart from adjacent unit cells in the respective conductive meta-structure layers by a same distance.

DETAILED DESCRIPTION

Figure 1:
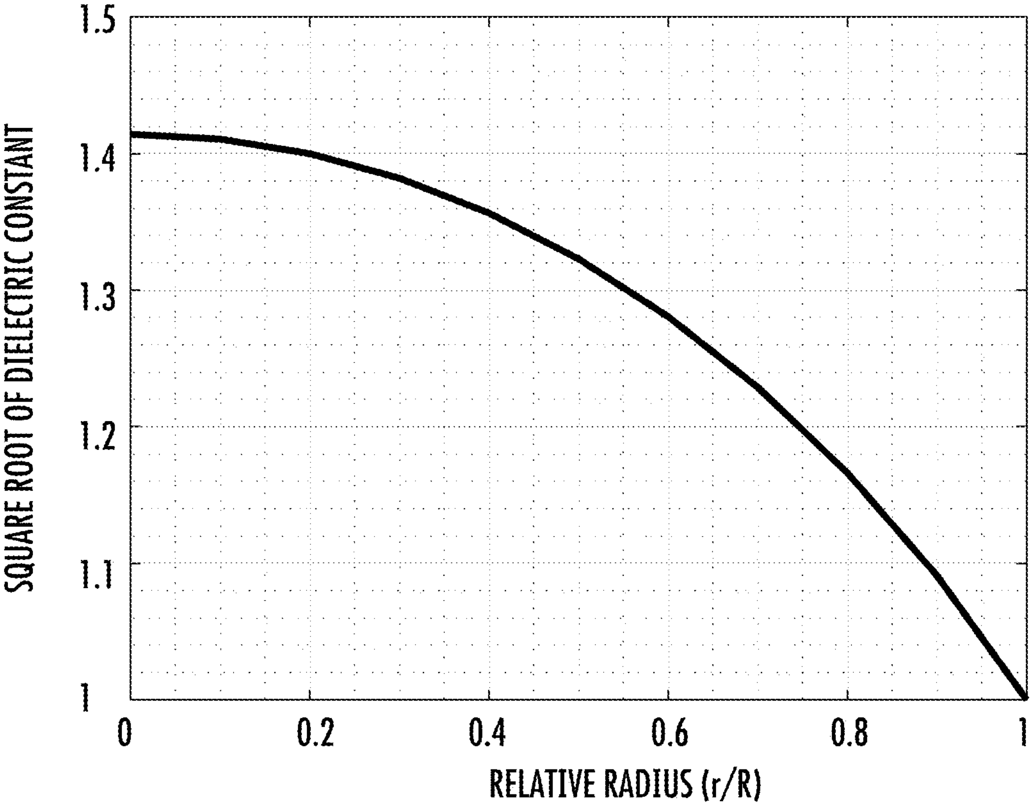
FIG. 1 is a graph that illustrates how the dielectric constant of a conventional spherical Luneburg lens varies as a function of the radius of the lens.

Pursuant to embodiments of the present invention, low-profile RF lenses are provided that may be step approximations of a Luneburg lens in one, two or even three orthogonal directions. These low-profile RF lenses may be, for example, flat lenses that have a depth that is at least five times, and as many as ten times or more, less than both a length and a width of the lens, or ellipsoidal lenses that have a maximum depth that is at least two times, and as many as five times or more, less than both a maximum length and a maximum width of the lens. The lenses may comprise a plurality of meta-structures that can provide very high effective dielectric constants in a lens that has a relatively small size and weight. The meta-structures may be arranged to form a step approximation of a Luneburg lens in one or more orthogonal directions.

In some embodiments, the RF lenses according to embodiments of the present invention may be fabricated using multi-layer printed circuit boards. These printed circuit boards may include a plurality of dielectric substrates with metallization layers formed thereon such that the dielectric substrates and the metallization layers are stacked in a depth direction. As used herein, a multi-layer printed circuit board refers to a printed circuit board that has at least two primary dielectric substrates. The multi-layer printed circuit board may comprise, for example, a plurality of single layer printed circuit boards that are bonded together in a stack using pre-preg or other materials. Each primary dielectric substrate may have a metallization layer formed on one or both sides thereof.

Each metallization layer included in the multi-layer printed circuit board may comprise a plurality of meta-structures. Herein, a meta-structure refers to a conductive structure that is part of an artificial dielectric material that comprises arrays of these conductive structures that are designed to have specific electromagnetic properties. The arrays of meta structures disclosed herein may be used to form step approximations of Luneburg lenses (e.g., step approximation of flat or elliptical Luneburg lenses) where the meta-structures and surrounding dielectric material form regions throughout the lens that have different effective dielectric constants. In some embodiments, all of the meta-structures may have the same shape, but the sizes of the meta-structures may be varied. Larger meta-structures have larger effective dielectric constants while smaller meta-structures have smaller effective dielectric constants. The overall effective dielectric constant of different regions of the RF lens will be a combination of the effective dielectric constant(s) of the meta-structures included in the region and the dielectric constant(s) of the dielectric substrate(s) in the region. The effective dielectric constant(s) of the meta structures will generally be larger than the dielectric constant(s) of the dielectric substrates and may tend to dominate the overall effective dielectric constant of each region, particularly in regions that include larger meta-structures. The meta-structures may be arranged so that a central portion of the lens has the highest effective dielectric constant, and the effective dielectric constant may get increasingly smaller with increasing distance from the center of the lens. The changes in the effective dielectric constant may be step changes, and these step changes may form a step approximation of the transfer function of a Luneburg lens in at least one, two or three orthogonal directions in different embodiments.

In other embodiments, RF lenses are provided that are formed using three-dimensional (3D) printing techniques. In these embodiments, the RF lens may comprise a block of dielectric material that has a plurality of conductive meta-structure formed therein. The dielectric block may comprise, for example, acrylonitrile butadiene styrene (ABS), which is a well-known thermoplastic polymer that is often used in injection molding applications and that is suitable for use in three-dimensional printing. A wide variety of other dielectric materials may be used to form the dielectric block including, as another example, polylactic acid (PLA). A plurality of meta-structures are formed within the dielectric block. The meta-structures may be arranged as a plurality of conductive meta-structure layers. In some embodiments, all of the meta-structures included in the RF lens may have the same shape, but the sizes of the meta-structures may be varied. Larger meta-structures have larger effective dielectric constants while smaller meta-structures have smaller effective dielectric constants. The meta-structures may be arranged so that a central portion of the lens has the highest effective dielectric constant, and the effective dielectric constant may get increasingly smaller with increasing distance from the center of the lens. The changes in the effective dielectric constant may be step changes, and these step changes may form a step approximation of the transfer function of a Luneburg lens in at least one, two or three orthogonal directions.

The RF lenses according to embodiments of the present invention may be used in a wide variety of different antennas. In one example embodiment, the antenna may comprise a two dimensional array of radiating elements that has multiple rows and columns of radiating elements. As illustrative examples, the array may comprise an 8×8 array having sixty-four radiating elements arranged in eight rows and eight columns, a 12×12 array having 144 radiating elements, or a 16×16 array having 256 radiating elements. The RF lens may be mounted forwardly of the array so that RF energy emitted by the array passes through the RF lens. In some embodiments, the RF lens may completely overlap the array (i.e., when viewed from the front, the RF lens completely hides the array). In other embodiments, the RF lens may only partially overlap the array (e.g., a central portion of the array). The RF lens may focus the RF energy emitted by the array to form very high gain antenna beams.

Pursuant to some embodiments of the present invention, RF lenses are provided that comprise a multilayer printed circuit board that includes a plurality of dielectric layers and a plurality of metallization layers that are alternatingly stacked, the plurality of metallization layers including at least a first metallization layer and a second metallization layer. Each metallization layer comprises a plurality of meta-structures, and the meta-structures are arranged to form a step approximation of a Luneburg lens in at least one direction, and in as many as three orthogonal directions.

The meta-structures included in the first metallization layer may, for example all have the same shape, and at least some of the meta-structures included in the first metallization layer may have different sizes than other of the meta-structures included in the first metallization layer. In such embodiments, the first metallization layer may be an interior metallization layer.

A metallization layer that is closest to being in the middle of the alternating stacked dielectric layers and metallization layers may include a meta-structure that is at least as large as any of the meta-structures included in the RF lens. Alternatively or additionally, outer ones of the metallization layers may include meta-structures that are at least as small as any of the meta-structures included in the RF lens. The meta-structures may have a closed perimeter and/or an open interior in example embodiments. In some embodiments, each meta-structure may have a circular ring shape.

Pursuant to further embodiments of the present invention, RF lenses are provided that comprise a dielectric block and a plurality of layers of conductive meta-structures that are embedded within the dielectric block. The plurality of conductive meta-structure layers include at least a first conductive meta-structure layer and a second conductive meta-structure layer. The meta-structures are arranged to form a step approximation of a Luneburg lens in at least one direction, and in as many as three orthogonal directions.

The meta-structures included in the first conductive meta-structure layer may, for example all have the same shape, and at least some of the meta-structures included in the first conductive meta-structure layer may have different sizes than other of the meta-structures included in the first conductive meta-structure layer. In such embodiments, the first conductive meta-structure layer may be an interior conductive meta-structure layer.

A conductive meta-structure layer that is closest to being in the middle of the RF lens may include a meta-structure that is at least as large as any of the other meta-structures included in the RF lens. Alternatively or additionally, outer ones of the conductive meta-structure layers may include meta-structures that are at least as small as any of the meta-structures included in the RF lens. In some embodiments, each meta-structure may have a cross-shape.

Pursuant to still further embodiments of the present invention, antennas are provided that comprise a two-dimensional array that includes at least two rows of radiating elements and at least two columns of radiating elements and a flat Luneburg lens positioned forwardly of the two-dimensional array and configured to receive RF radiation emitted by the two-dimensional array. The flat Luneburg lens may only overlap a central portion of the two-dimensional array and may only overlap, for example, less than two-thirds, less than one-half or even less than on-third of the radiating elements in the two-dimensional array. The flat Luneburg lens may comprise any of the RF lenses according to embodiments of the present invention that are described herein.

Herein, reference will be made to the azimuth and elevation planes, which refer to a pair of orthogonal planes. As will be discussed in detail herein, the RF lenses according to embodiments of the present invention may be used to focus RF energy emitted by multi-row, multi-column arrays of radiating elements in some embodiments (e.g., an eight row, eight column array of radiating elements having sixty-four radiating elements). The rows may extend in a width direction of the RF lens and the columns may extend in a length direction of the RF lens that is perpendicular to the width direction. The RF lens may also extend in a depth or "thickness" direction that is perpendicular to both the length direction and the width direction. The azimuth plane refers to a plane that bisects the RF lens and that extends in the width and depth directions. The elevation plane refers to a plane that bisects the RF lens and that extends in the length and depth directions. An azimuth plot of an antenna beam is a plot of the magnitude of the RF energy as a function of angle in the azimuth plane, where the plot is taken at the angle in the elevation plane where the antenna beam has peak directivity. An elevation plot of an antenna beam is a plot of the magnitude of the RF energy as a function of angle in the elevation plane, where the plot is taken at the angle in the azimuth plane where the antenna beam has peak directivity.

Reference will also be made herein to the 3 dB and 10 dB beamwidths of various antenna beams in the azimuth and elevation planes. The 3 dB azimuth (or elevation) beamwidth of an antenna beam is the angle subtended in an azimuth (or elevation) plot of the portion of main lobe of the antenna beam where the magnitude of the RF energy is within 3 dB of the peak magnitude. The 10 dB azimuth (or elevation) beamwidth of an antenna beam is the angle subtended in an azimuth (or elevation) plot of the portion of main lobe of the antenna beam where the magnitude of the RF energy is within 10 dB of the peak magnitude.

Figure 2A:
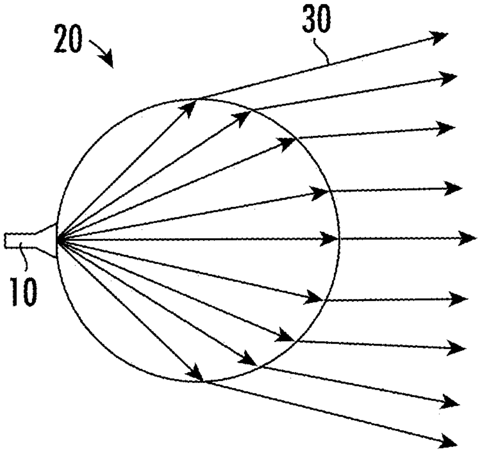
FIG. 2A is a schematic drawing illustrating the operation of a conventional spherical RF lens that is formed of a homogeneous dielectric material.

FIG. 2A is a schematic drawing illustrating the operation of a conventional spherical RF lens 20 that is formed using a homogeneous dielectric material (i.e., all portions of the RF lens have the same dielectric constant).

As shown in FIG. 2A, an RF source 10 may emit RF energy that is incident on the RF lens 20. The RF lens 20 tends to focus the RF energy so that, for example, the 3 dB and 10 dB azimuth (and elevation) beamwidths of the radiation pattern of the RF energy exiting the RF lens 20 are smaller than the 3 dB and 10 dB azimuth (and elevation) beamwidths of the radiation pattern of the RF energy exiting the RF source 10. This shows that the dielectric material in the RF lens 20 acts to focus the RF energy output by the RF source 10. The higher the dielectric constant of the dielectric material forming the RF lens 20, the greater the amount of focusing.

The lines 30 in FIG. 2A schematically illustrate the paths taken by various sub-components of the RF energy incident to RF lens 20 from RF source 10. As can be seen by the portions of the lines 30 that are within the interior of RF lens 20, different sub-components of the RF energy pass through different amounts of lens material. Since the dielectric material forming RF lens 20 is homogeneous with the same dielectric constant throughout, different sub-components of the RF energy will be focused different amounts by the RF lens 20 (i.e., sub-components of the RF energy that travel through a larger amount of lens material will be focused more). As a result, the RF lens 20 will not focus the RF energy incident thereto to a common focal point.

Figure 2B:
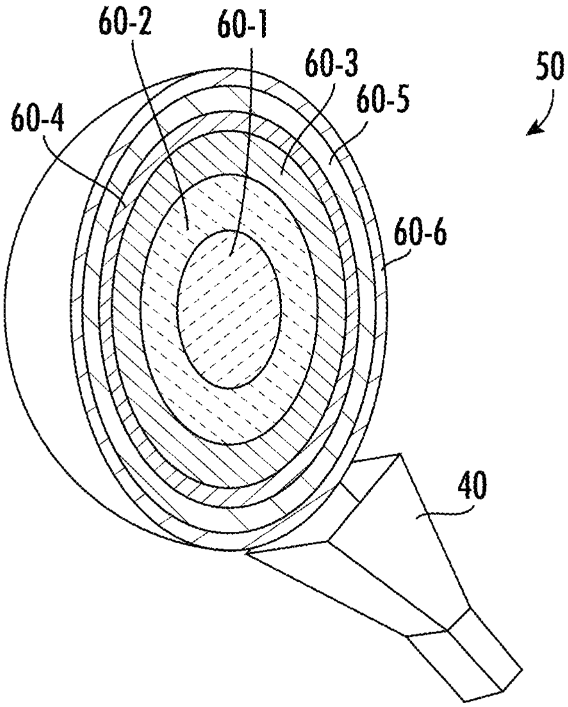
FIG. 2B is a schematic perspective sectional view of a spherical RF lens that is a step approximation of a Luneburg lens.

FIG. 2B is a schematic perspective sectional view of a step approximation of a Luneburg lens 50 that illustrates the construction thereof. The view of FIG. 2B only shows one half of the RF lens 50 so that the inner construction of the lens 50 is visible in the drawing. As shown in FIG. 2B, the step approximation of a Luneburg lens 50 includes six regions 60-1 through 60-6 that are formed of materials having different dielectric constants. The innermost region 60-1 has a sphere shape and is formed of a material having the highest dielectric constant, while the remaining regions 60-2 through 60-6 comprise annular spheres having increasingly larger diameters and that are formed of dielectric materials having decreased dielectric constants. The square roots of the dielectric constants of the materials used to form regions 60-1 through 60-6 may be selected as points along the curve of FIG. 1 so that the RF lens 50 is a six-step approximation of a Luneburg lens. As is further shown in FIG. 2B, an RF source 40 may inject RF energy into the Luneburg lens 50.

Figure 2C:
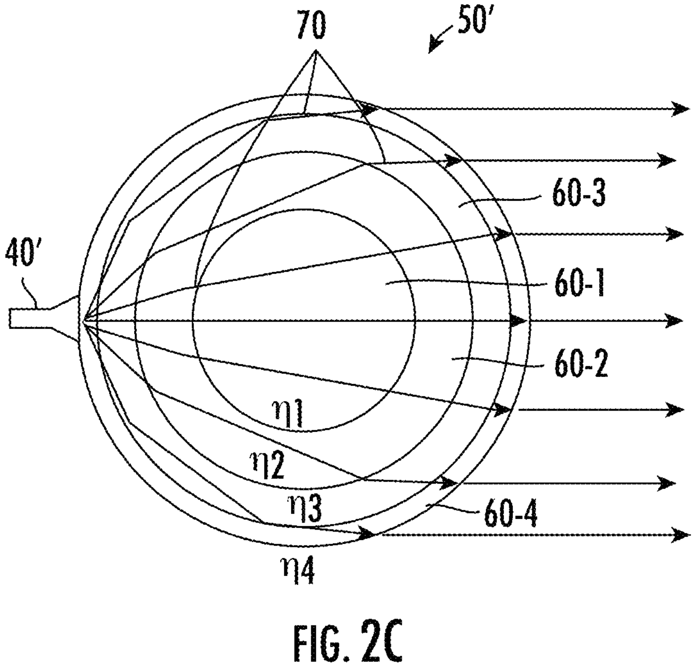
FIG. 2C is a schematic drawing illustrating the operation of a Luneburg lens that is similar to the Luneburg lens of FIG. 2B.

FIG. 2C is a schematic drawing illustrating operation of a Luneburg lens 50' that is similar to the lens 50 of FIG. 2B, except that the lens 50' is a four-step approximation of a spherical Luneburg lens while lens 50 of FIG. 2B is a six-step approximation. As shown in FIG. 2C, an RF source 40' may emit RF energy that is incident on the RF lens 50'. The RF lens 50' acts to focus the RF energy so that, for example, the 3 dB and 10 dB azimuth (and elevation) beamwidths of the radiation pattern of the RF energy exiting the RF lens 50' are smaller than the respective 3 dB and 10 dB azimuth (and elevation) beamwidths of the radiation pattern of the RF energy exiting the RF source 40'. As can be seen by the lines 70 in FIG. 2C that illustrate the paths taken by various sub-components of the RF energy incident to RF lens 50', different sub-components of the RF energy pass through different amounts of lens material. However, as can also be seen, the sub-components that have longer paths through the RF lens 50' pass at least partly through regions of the RF lens 50' that have lower dielectric constants. As a result, each sub-component of the RF energy that is incident to RF lens 50' is focused about the same amount, and hence RF lens 50' can focus RF energy incident thereto to a constant focal point. The greater the number of steps in the step approximation of a Luneburg lens the closer the lens 50' will come to focusing all of the RF energy incident thereto to the same focal point.

Figure 3A:
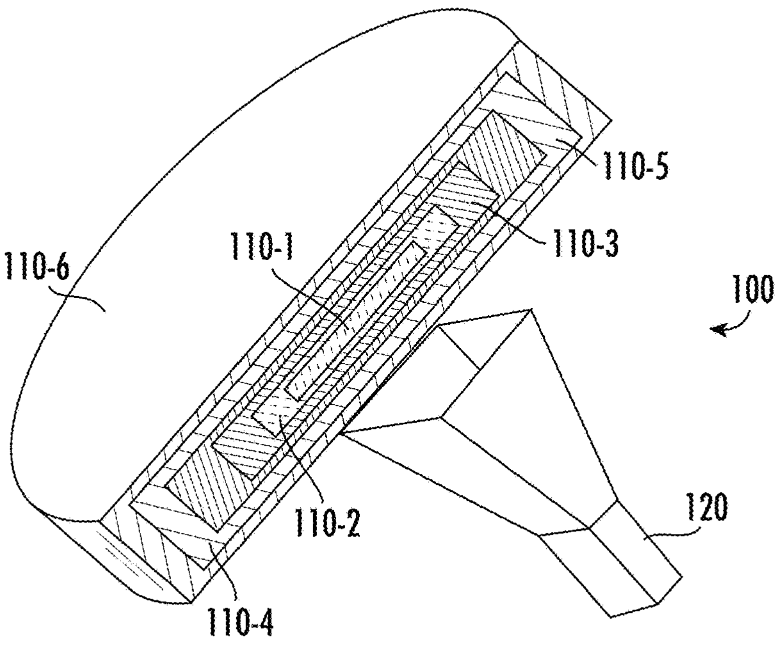
FIG. 3A is a schematic perspective sectional view of a flat Luneburg lens.
Figure 3B:
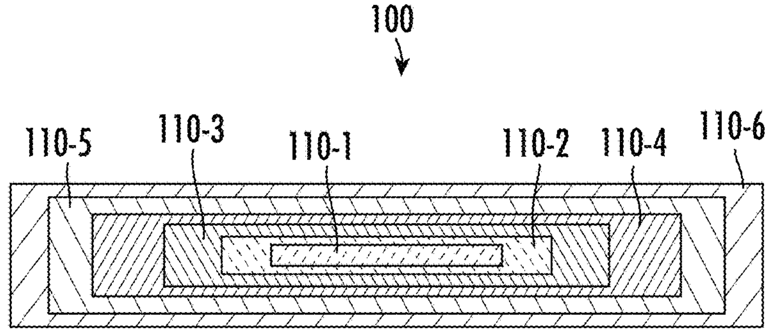
FIG. 3B is a front view of the flat Luneburg lens of FIG. 3A.

FIG. 3A is a schematic perspective sectional view of a so-called "flat" Luneburg lens 100. The view of FIG. 3A only shows one half of the RF lens 100 so that the inner construction of the lens 100 is visible in the drawing. FIG. 3B is a front view of the sectional view of flat Luneburg lens of FIG. 3A The "flat" Luneburg lens 100 of FIGS. 3A-3B, like a step approximation of a spherical Luneburg lens, has regions with varying dielectric constants, but the flat Luneburg lens 100 has a disc shape as opposed to a spherical shape. An RF source 120 is positioned behind the RF lens 100 so that the RF energy enters the RF lens 100 through the flat rear surface of the lens 100. The flat Luneburg lens 100 may perform similarly to the RF lens 50 of FIG. 2B, although some degradation in performance may be expected, particularly when the RF source is scanned from its boresight pointing direction so that the RF energy does not enter the RF lens perpendicularly to the back surface of the RF lens 100. Generally speaking, the more the angle of incidence of the RF energy to the RF lens 100 differs from 90° the greater amount of degradation in the performance of the lens 100. The performance degradation may be very minor for RF energy entering the lens 100 at incidence angles that are within 5-10° of 90°, while the performance degradation may be significant for RF energy entering the lens 100 at large scan angles (e.g., incidence angles that differ from 90° by more than 40°).

Figure 3C:
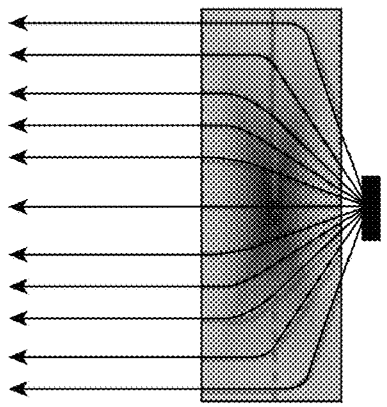
FIG. 3C is a schematic drawing illustrating the operation of the flat Luneburg lens of FIGS. 3A-3B.

As shown in FIGS. 3A-3B, the flat Luneburg lens 100 includes six regions 110-1 through 110-6 that are formed of materials having different dielectric constants. The innermost region 110-1 has a disc shape (i.e., forms a circle in the plane defined by the length and width directions of the lens 100 that has a constant diameter in the depth direction of the lens 100) and is formed of a material having the highest dielectric constant, while the remaining regions 110-2 through 110-6 comprise annular discs that fully enclose the discs/annular discs positioned inwardly thereof. The annular discs 110-2 through 110-6 have increasingly larger diameters and are formed of dielectric materials having decreasing dielectric constants. The dielectric constants of the materials used to form regions 110-1 through 110-6 may be selected so that RF energy passing through different portions of the lens 100 will experience approximately the same amount of focusing by the lens 100. This is shown schematically in FIG. 3C.

The flat Luneburg lens 100 of FIGS. 3A-3B may be expensive to manufacture. Moreover, if conventional dielectric materials are used to form the flat Luneburg lens 100 it may be necessary to use expensive and/or heavy dielectric materials to form the innermost regions 110 of the lens (which have the highest dielectric constants), which can make the use of such lenses commercially impractical. Moreover, if artificial dielectric materials are used, it may be difficult to ensure that the RF energy will experience the same amount of focusing since artificial dielectric materials for RF lenses are typically implemented using small blocks of artificial dielectric material, where the effective dielectric constant of each block depends on its orientation with respect to incident RF energy. In spherical RF lenses, the RF energy may pass through a sufficiently large number of blocks of artificial dielectric material (which are randomly oriented) so that the differences in orientation tend to average out and most of the RF energy experiences approximately the same amount of focusing. The same may not be true in a flat Luneburg lens such as lens 100.

Embodiments of the present invention will now be discussed in greater detail with reference to FIGS. 4A through 7.

Figure 4A:
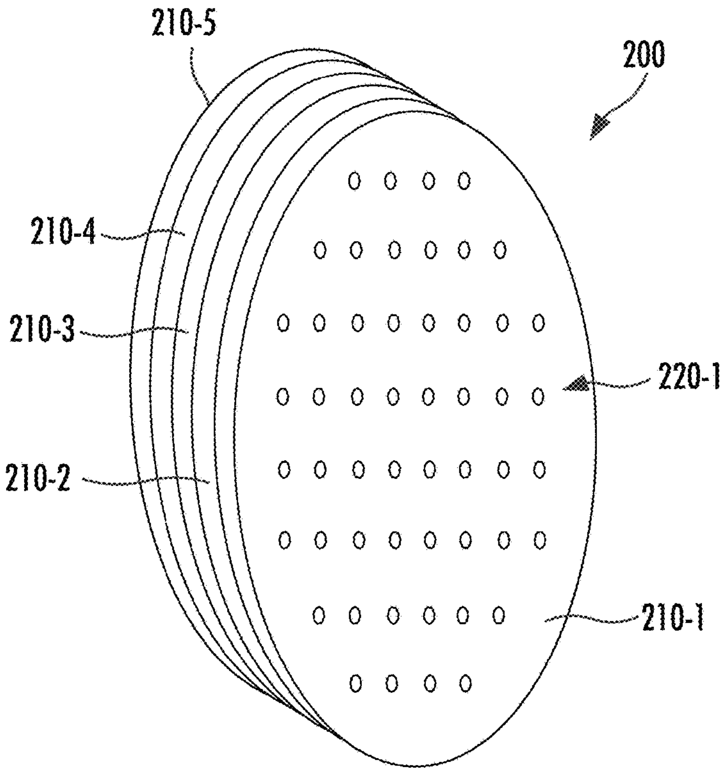
FIG. 4A is a schematic perspective view of a flat printed circuit board based Luneburg lens according to embodiments of the present invention.
Figure 4B:
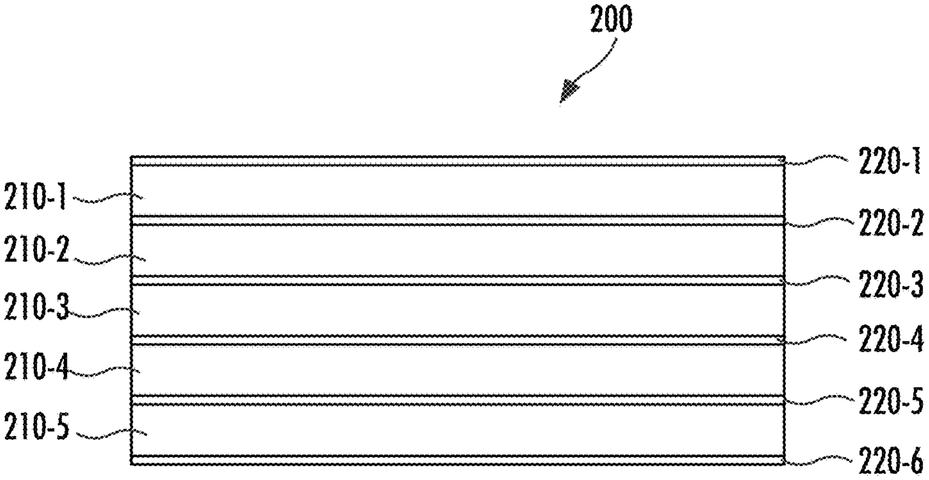
FIG. 4B is a schematic side view of the flat printed circuit board based Luneburg lens of FIG. 4A.
Figure 4C:
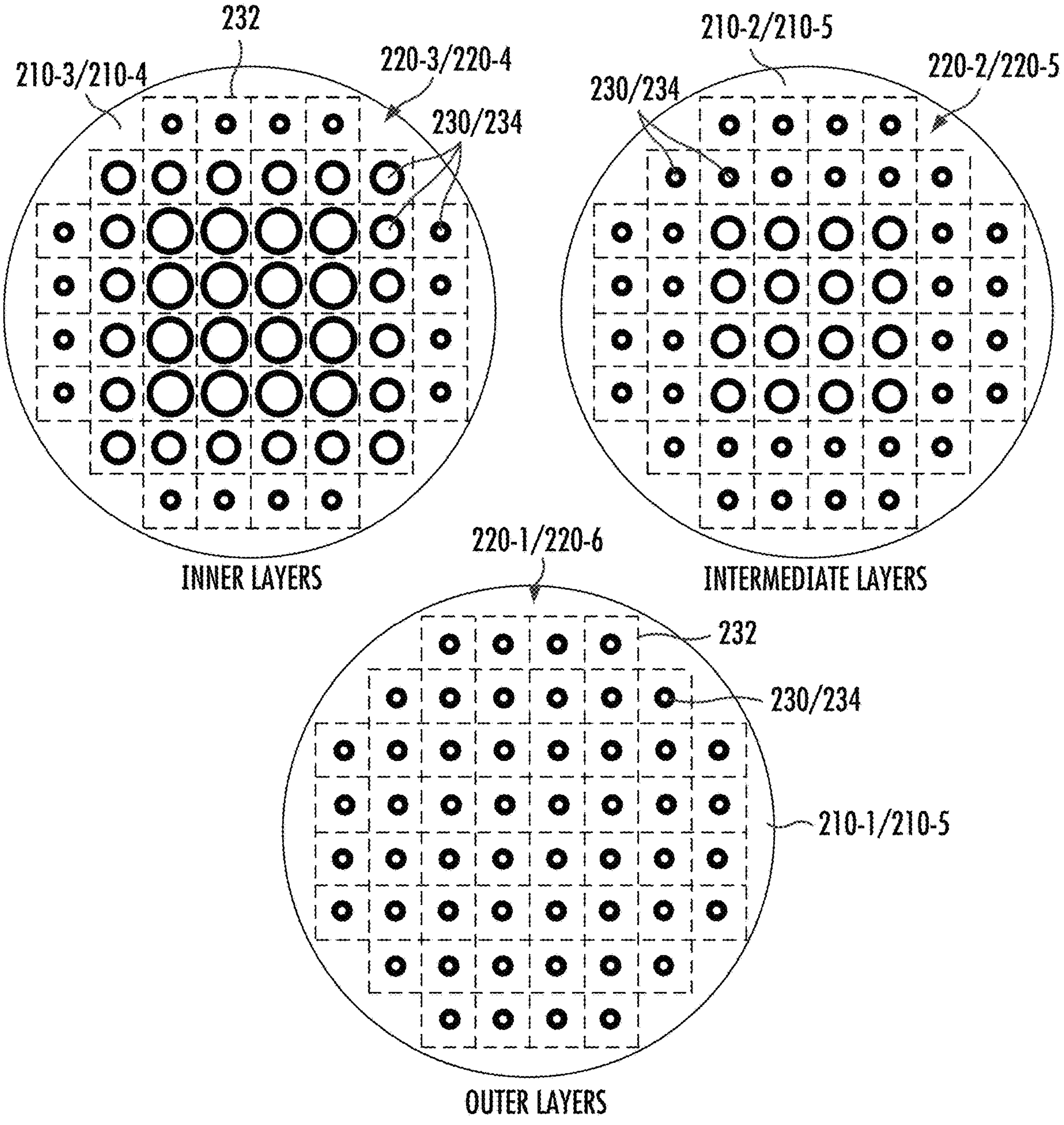
FIG. 4C is a collage of three plan views that illustrate the design of the six metallization layers included in the flat Luneburg lens of FIGS. 4A-4B.

FIG. 4A is a schematic perspective view of a flat printed circuit board based Luneburg lens 200 according to embodiments of the present invention. FIG. 4B is a schematic side view of the flat printed circuit board based Luneburg lens 200 of FIG. 4A. FIG. 4C is a series of plan views of each of the metallization layers included in the flat Luneburg lens 200 of FIG. 4A. The Luneburg lens 200 of FIGS. 4A-4C is a step approximation of a Luneburg lens.

As shown in FIGS. 4A-4B, the flat printed circuit board based Luneburg lens 200 comprises a total of five dielectric substrates 210-1 through 210-5 and a total of six metallization layers 220-1 through 220-6. Each dielectric substrate 210 may comprises a printed circuit board dielectric substrate such as an FR-4 dielectric substrate or an RF-grade dielectric substrate. Each metallization layer 220 may be a copper or other metal layer that is formed on a respective one of the major surfaces of the dielectric substrates 210 that is then patterned to form a plurality of conductive structures thereon. The dielectric substrates 210 and metallization layers 220 may be stacked to form a multi-layer printed circuit board structure, using techniques that are well understood in the art.

FIG. 4C is a composite view that illustrates each of the metallization layers 220 as formed on an underlying or overlying one of the dielectric substrates 210. Since metallization layer 220-1 is identical to metallization layer 220-6, metallization layer 220-2 is identical to metallization layer 220-5, and metallization layer 220-3 is identical to metallization layer 220-4, only three metallization layers are shown in FIG. 4C. Each dielectric substrate 210 and metallization layer 220 extend in the length (L) and width (W) directions, and are stacked in the depth (D) direction.

As shown in FIG. 4C, each metallization layer 220 is divided into a plurality of unit cells 232, where each unit cell 232 has the same area. A meta-structure 230 is formed in each unit cell 232, where each meta-structure 230 comprises an individual metal pattern on the dielectric substrate 210. As noted above, a meta-structure refers to a conductive structure that is part of an artificial dielectric material that comprises arrays of these conductive structures that are designed to have specific electromagnetic properties. Here, each meta-structure 230 is implemented as an annular metal ring 234. The metal rings 234 have different diameters depending upon the metallization layer 220 and the position of the metal ring 234 within the metallization layer 220. Since each unit cell 232 has the same area, the effective dielectric constant of the unit cells 232 will vary based on the size of the metal ring 234 included in the unit cell 232. In particular, unit cells 232 having larger metal rings 234 formed therein will have higher effective dielectric constants, while unit cells 232 having smaller metal rings 234 formed therein will have lower effective dielectric constants. In the embodiment of FIGS. 4A-4C, meta-structures 230 having three different sizes are used, namely metal rings 234 having small, medium and large diameters.

As shown in FIG. 4C, the outer metallization layers 220-1 and 220-6 each only have unit cells 232 that are formed with small metal rings 234. These layers generally correspond to the outermost layer of the flat Luneburg lens depicted in FIGS. 3A-3B. In contrast, the unit cells 232 that form the outer rows and columns of the second and fifth metallization layers 220-2 and 220-5, which are intermediate layers, each are implemented using small metal rings 234, while the unit cells 232 that are in the central portion of these metallization layers 220-2 and 220-5 are implemented using medium metal rings 234. Finally, for the innermost metallization layers 220-3 and 220-4, the unit cells 232 that form the outer perimeter of these metallization layers 220-3 and 220-4 are implemented using small metal rings 234, the unit cells 232 that form the innermost portion of these metallization layers 220-3 and 220-4 are implemented using large metal rings 234, and the unit cells 232 that are in between the outer perimeter and the inner most portion of these metallization layers 220-3 and 220-4 are implemented using medium metal rings 234. This arrangement may form a step approximation of a flat Luneburg lens.

Notably, the flat Luneburg lens 200 can be formed using commercially available material and may have low cost, weight and design complexity.

It will be appreciated that the number of dielectric layers 210 and metallization layers 220 may be varied from what is shown in FIGS. 4A-4C, with either fewer or more dielectric layers 210 and metallization layers 220 being provided in other embodiments. Likewise, the meta-structures 230 may have fewer or more different sizes than the three different sizes included in the lens 200. It will also be appreciated that different shaped meta-structures 230 may be used (e.g., polygonal rings, rings that are not completely closed, etc.), and that all of the meta-structures 230 need not have the same shape in other embodiments.

Figure 4D:
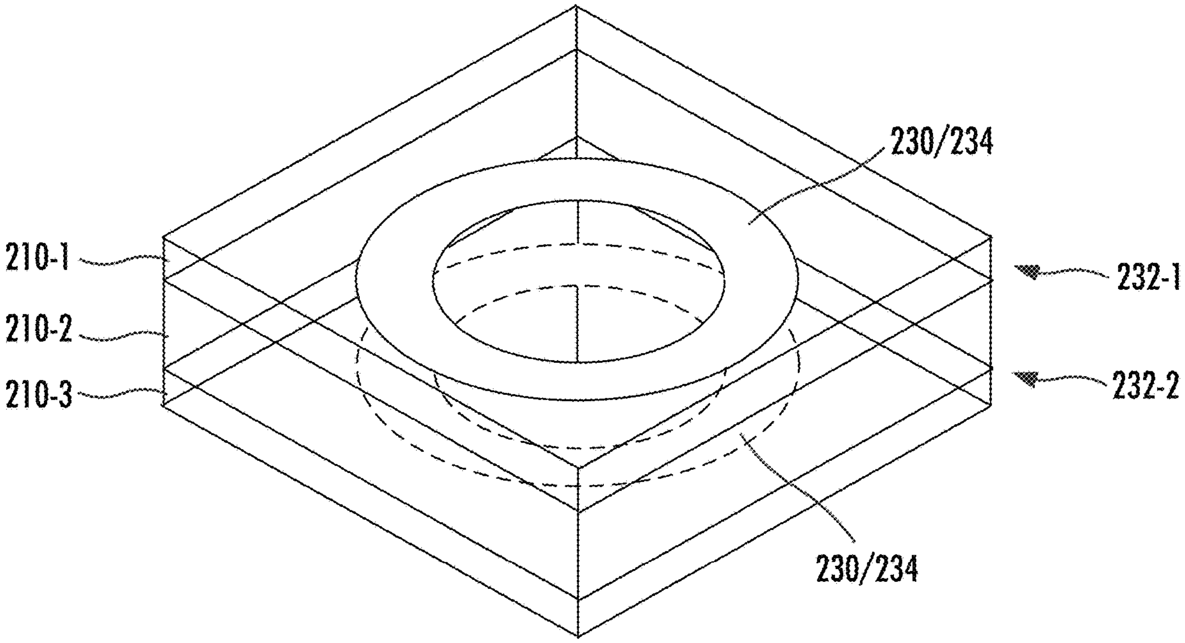
FIG. 4D is a schematic perspective view of two of the unit cells included in the flat Luneburg lens of FIGS. 4A-4C.

FIG. 4D is a schematic perspective view of two of the unit cells 232-1, 232-2 of the flat Luneburg lens 200 of FIGS. 4A-4C. As shown in FIG. 4D, the first unit cell 232-1 may be viewed as including a portion of a first dielectric substrate (here a lower portion of dielectric substrate 210-1), a portion of a second (adjacent) dielectric substrate 210, (here an upper portion of dielectric substrate 210-2), and a meta structure 230 that is interposed between the two dielectric substrates 210-1, 210-2. The second unit cell 232-2 may be viewed as including a portion of a first dielectric substrate (here a lower portion of dielectric substrate 210-2), a portion of a second (adjacent) dielectric substrate 210, (here an upper portion of dielectric substrate 210-3), and a meta structure 230 that is interposed between the two dielectric substrates 210-2, 210-3. In the depicted embodiment, the meta structures 230 are each in the form of an annular ring 234.

Thus, the RF lens 200 comprise a multilayer printed circuit board that includes a plurality of dielectric layers 210 and a plurality of metallization layers 220 that are alternatingly stacked. The plurality of metallization layers 220 includes at least a first metallization layer 220-1 and a second metallization layer 220-2. Each metallization layer 220 comprises a plurality of meta-structures 230, and the meta-structures 230 are arranged to form a step approximation of a Luneburg lens in at least one direction, and in as many as three orthogonal directions.

The meta-structures 230 included in a first of the metallization layers (e.g., metallization layer 220-4) may, for example all have the same shape. At least some of the meta-structures 230 included in this metallization layer 220-4 may have different sizes than other of the meta-structures 230 included in the metallization layer 220-4. The first of the metallization layers 220-4 may be an interior metallization layer.

A metallization layer 220 that is closest to being in the middle of the alternating stacked dielectric layers 210 and metallization layers 220 may include a meta-structure 230 that is at least as large as any of the meta-structures 230 included in the RF lens 200. Alternatively or additionally, outer ones of the metallization layers 220-1, 220-6 may include meta-structures 230 that are at least as small as any of the meta-structures 230 included in the RF lens 200. The meta-structures 230 may have a closed perimeter and/or an open interior in example embodiments. In some embodiments, each meta-structure 230 may have a circular ring shape The RF lens 200 of FIGS. 4A-4D may be lightweight, have low cost, and be easy to manufacture. Moreover, the RF lens 200 of FIGS. 4A-4D may have the ability to significantly focus RF energy incident thereon, particularly RF energy that enters the RF lens at incident angles of close to 90 degrees. Conventional Luneburg lenses may provide high performance, but are often large, heavy and expensive to manufacture, making them commercially unsuitable for many applications. The RF lenses according to embodiments of the present invention may have performance nearly as good as conventional spherical Luneburg lenses while being much smaller, lighter, cheaper and easier to fabricate, allowing the RF lenses according to embodiments of the present invention to be used in many more applications.

The RF lenses according to embodiments of the present invention that are described above are formed using printed circuit boards. Pursuant to further embodiments of the present invention, flat (or ellipsoidal) Luneburg lens are formed using three dimensional printing techniques. The use of three dimensional printing allows for greater flexibility in the shapes of the meta-structures, as they can have any desired thickness in the depth direction and are not limited by the thickness of the metal patterns available in standard printed circuit boards.

Figure 5A:
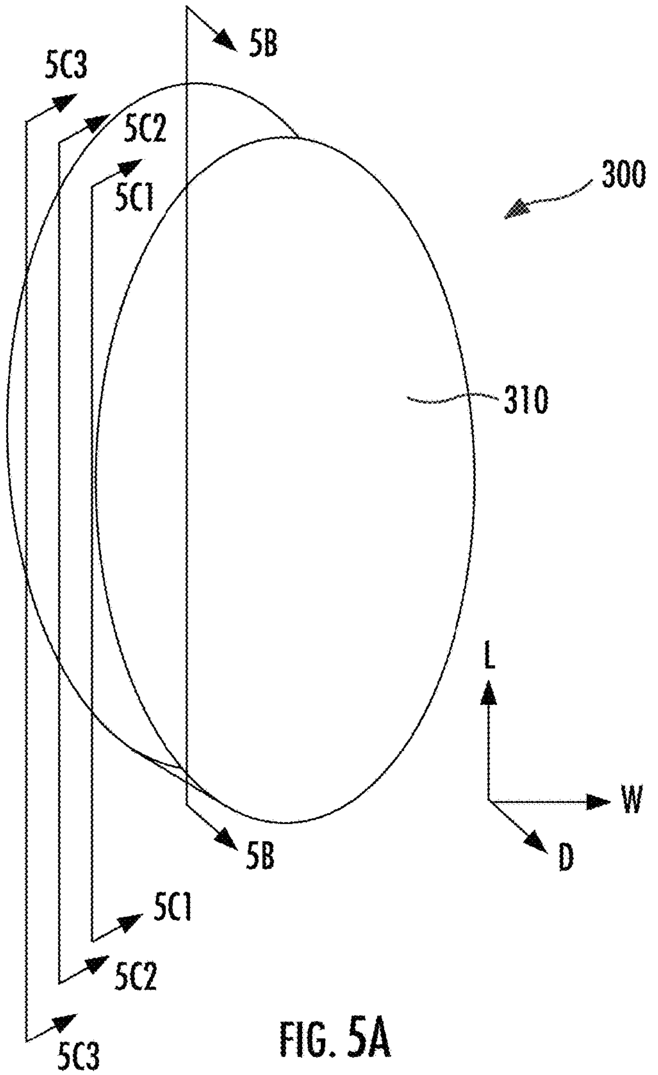
FIG. 5A is a schematic perspective sectional view of a flat 3D-printed Luneburg lens according to further embodiments of the present invention.
Figure 5B:
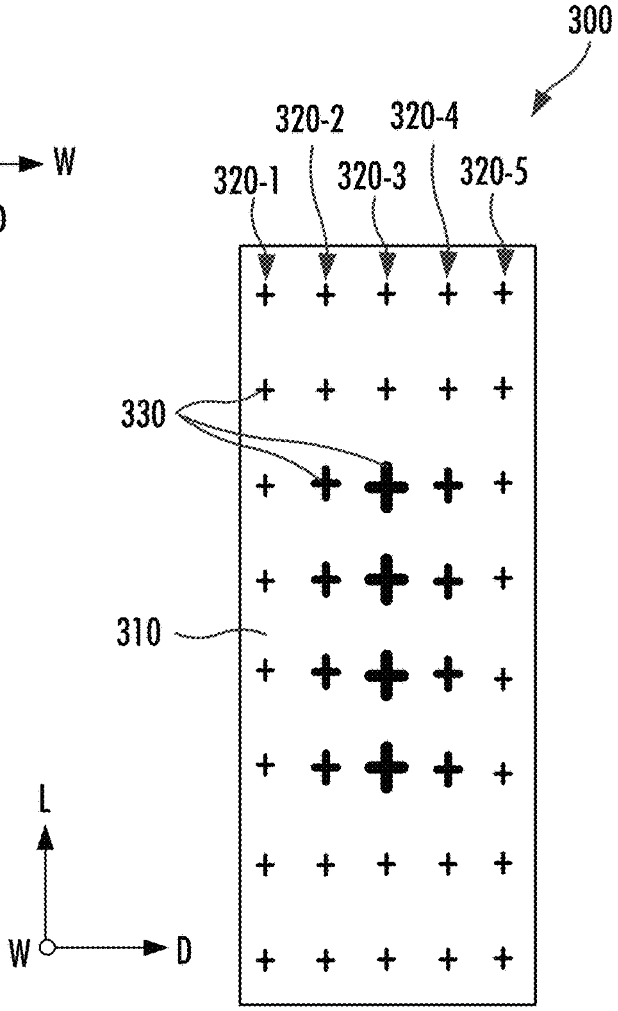
FIG. 5B is a schematic cross-sectional view taken along line 5B-5B of FIG. 5A.
Figure 5C:
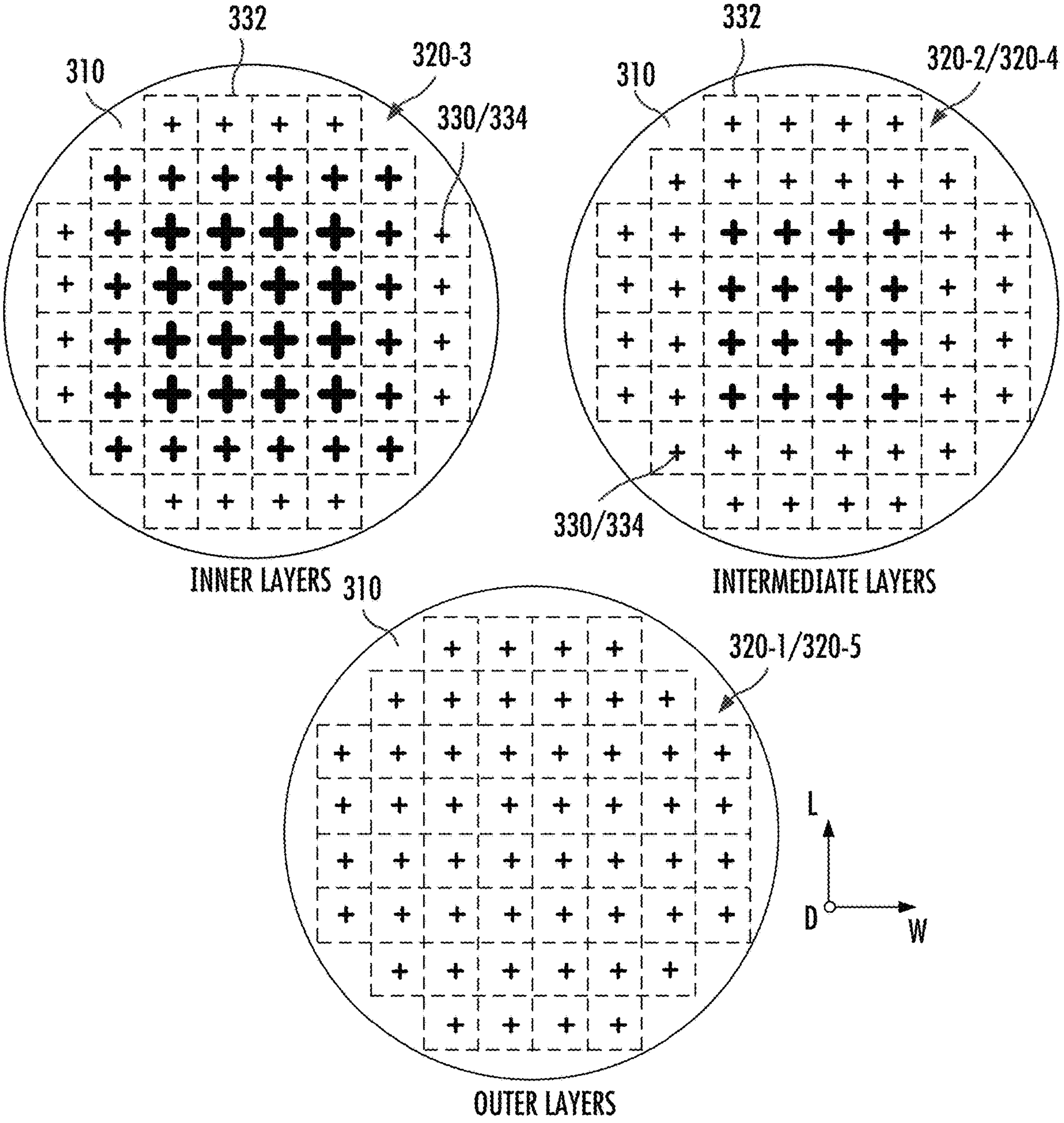
FIG. 5C is a collage of three cross-sectional view taken along lines 5C1-5C1, 5C2-5C2 and 5C3-5C3, respectively, of FIG. 5A.

FIGS. 5A-5C illustrate a flat RF lens 300 according to further embodiments of the present invention that may be formed via three dimensional printing. In particular, FIG. 5A is a schematic perspective view of the flat 3D-printed RF lens 300, FIG. 5B is a schematic cross-sectional view taken along line 5B-5B of FIG. 5A, and FIG. 5C is a collage of three cross-sectional views taken along lines 5C1-5C1, 5C2-5C2 and 5C3-5C3, respectively, of FIG. 5A.

As shown in FIGS. 5A-5B, the flat 3D-printed RF lens 300 comprises a plurality of meta-structures 330 that are embedded within a dielectric block 310. The meta-structures 330 are arranged as conductive meta-structure layers 320-1 through 320-5. The dielectric block 310 may comprise one or more dielectric materials that are suitable for use in 3D printing such as, for example, ABS. Each conductive meta-structure layer 320 may comprise a layer of individual meta-structures 330 that are formed of copper or another suitable metal within the dielectric block 310. The five conductive meta-structure layers 320-1 through 320-5 may be stacked in a depth (D) direction of the flat 3D-printed RF lens 300, and each conductive meta-structure layer 320 may extend in the length (L) and width (W) directions. Each conductive meta-structure layer 320 may comprise a plurality of meta-structures 330, where each meta-structure 330 and its surrounding material of dielectric block 310 comprises a unit cell 332 of a meta-surface.

FIG. 5C is a composite view that illustrates each of the conductive meta-structure layers 320 included in the flat 3D-printed RF lens 300. As shown, each conductive meta-structure layer 320 is divided into a plurality of unit cells 332, where each unit cell 332 has the same area and volume (i.e., the length, width and depth). A meta-structure 330 is formed in each unit cell 332, where each meta-structure 330 comprises a metal structure that is embedded in the portion of the dielectric block 310 that is part of the unit cell 332.

Figure 5D:
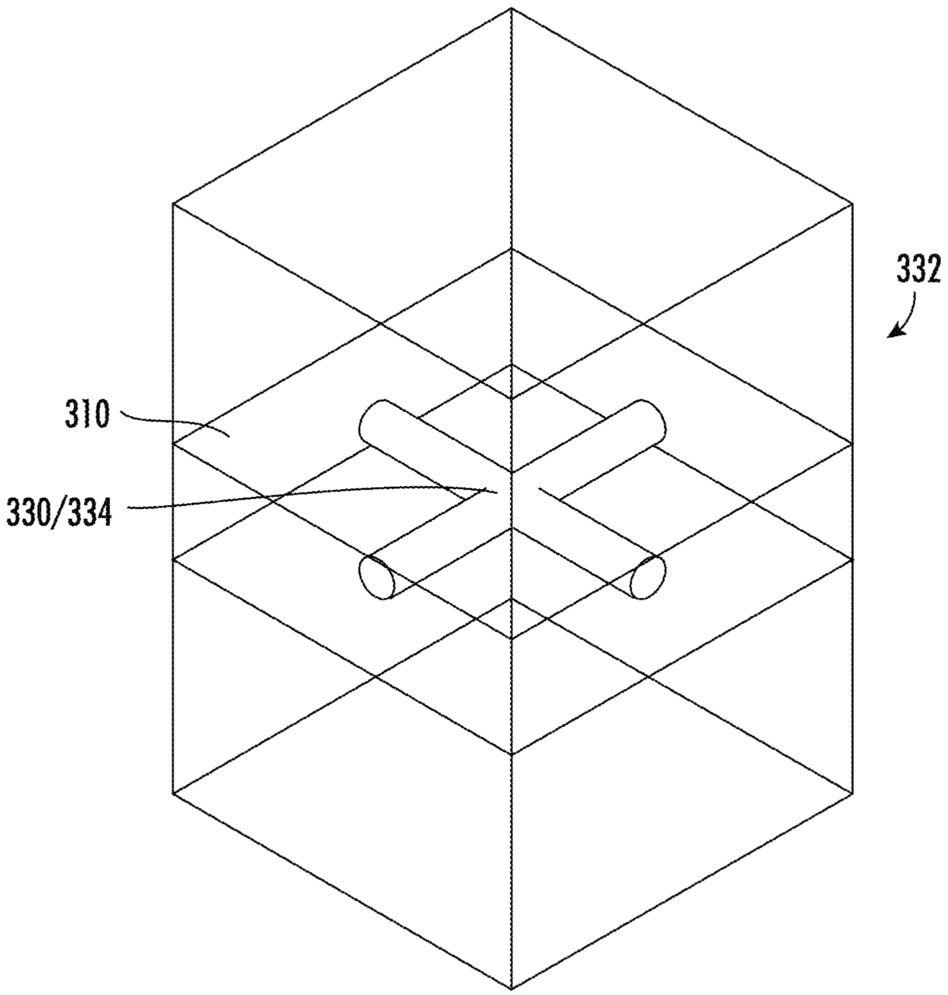
FIG. 5D is a schematic perspective view of one of the unit cells included in the flat Luneburg lens of FIGS. 5A-5C.

FIG. 5D is a schematic perspective view of one of the unit cells 332 of the flat Luneburg lens 300 of FIGS. 5A-5C. As shown in FIG. 5D, the meta-structure 330 that is formed in the unit cell 332 is a cross-shaped metal element 334 that is embedded in the dielectric material of the dielectric block 310. The cross-shaped metal element 334 may comprise two coplanar solid metal cylinders that intersect at a right angle in their respective centers. The length and/or diameter of the two cylinders that form each meta-structure 330 may be varied to set the effective dielectric constant of each unit cell 332 to a desired value.

As shown in FIGS. 5B-5C, in the same way that the metal rings 234 of RF lens 200 have different diameters depending upon their respective positions within the RF lens 200, here the cross-shaped metal elements 334 likewise have different sizes based on their respective positions within the RF lens 300. The sizes of the cross-shaped metal element 334 may be varied so that the RF lens 300 will be a step approximation of a flat Luneburg lens. In particular, unit cells 332 having larger cross-shaped metal element 334 (and hence higher effective dielectric constants) are positioned in the middle portion of the RF lens 300, while unit cells 332 having progressively smaller cross-shaped metal element 334 (and hence progressively lower effective dielectric constants) are used for unit cells 332 that are at increasing distances from the center of the RF lens 300. As the meta-structures 330 having different effective dielectric constants included in RF lens 300 are arranged in the same general manner as the corresponding meta-structures 230 in RF lens 200, further description of the positioning of the meta-structures 330 with higher and lower effective dielectric constants will be omitted herein. In the embodiment of FIGS. 5A-5D, meta-structures 330 having three different sizes are shown as an example. The flat Luneburg lens 300 can be formed using commercially available material and may have low cost, weight and design complexity.

Thus, as shown in FIGS. 5A-5D, pursuant to further embodiments of the present invention, RF lenses 300 are provided that comprise a dielectric block 510 and a plurality of conductive meta-structure layers 520 that are embedded within the dielectric block 510. The plurality of conductive meta-structure layers 520 include at least a first conductive meta-structure layer 520-1 and a second conductive meta-structure layer 520-2. The meta-structures 530 that are in the conductive meta-structure layers 520 are arranged to form a step approximation of a Luneburg lens in at least one direction, and in as many as three orthogonal directions. The meta-structures 530 included in a first of the conductive meta-structure layers (e.g., layer 520-3) may, for example all have the same shape, and at least some of the meta-structures included in the first of the conductive meta-structure layer 520-3 may have different sizes than other of the meta-structures 530 included in the first of the conductive meta-structure layers 520-3. In such embodiments, the first of the conductive meta-structure layers 520-3 may be an interior conductive meta-structure layer 520. A conductive meta-structure layer 520-3 that is closest to being in the middle of the RF lens 500 may include a meta-structure 530 that is at least as large as any of the other meta-structures 530 included in the RF lens 500. Alternatively or additionally, outer ones of the conductive meta-structure layers 520 may include meta-structures 530 that are at least as small as any of the meta-structures 530 included in the RF lens 500. In some embodiments, each meta-structure 530 may have a cross-shape.

It will be appreciated that the number of conductive meta-structures layers 320 may be varied from what is shown in FIGS. 5A-5C, and the meta-structures 330 may have fewer or more different sizes than the three different sizes included in the RF lens 300. It will also be appreciated that different shaped meta-structures 330 may be used (e.g., circular rings, polygonal rings, rings that are not completely closed, star-shaped metal elements, etc.), and that all of the meta-structures 330 need not have the same shape in other embodiments.

Figure 6:
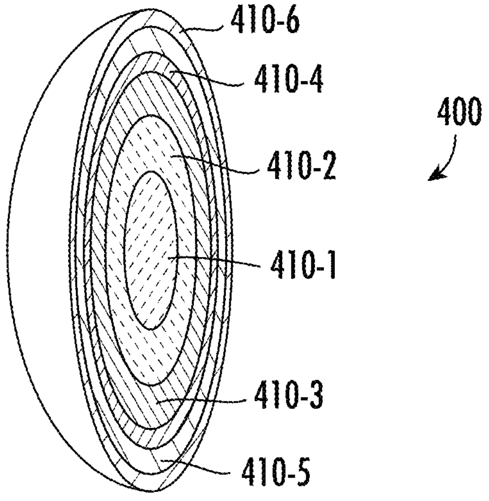
FIG. 6 is a schematic perspective sectional view of an ellipsoidal Luneburg lens according to still further embodiments of the present invention.

FIG. 6 is a schematic perspective view of an ellipsoidal Luneburg lens 400. The ellipsoidal Luneburg lens 400 is a compromise between the spherical Luneburg lens 50 of FIG. 2B and the flat Luneburg lens 100 of FIG. 3A. The ellipsoidal Luneburg lens 400 includes six regions 410-1 through 410-6 that are formed of materials that have different dielectric constants, with the dielectric constants decreasing for layers further from the center of the lens 400. The dielectric constants of the materials used to form regions 410-1 through 410-6 may be selected so that RF energy passing through different portions of the lens 100 will experience approximately the same amount of focusing by the lens 100.

The ellipsoidal Luneburg lens 400 may have a significantly reduced thickness as compared to the spherical Luneburg lens 50 of FIG. 2B, which may advantageously reduce the cost and weight of the Luneburg lens 400 as compared to the Luneburg lens 50. Moreover, by using an ellipsoidal lens design, the performance of Luneburg lens 400 is improved with respect to RF energy that is "off-boresight" as compared to the flat Luneburg lens 100 of FIG. 3A. Since in many applications the amount that the incident RF energy may be scanned off boresight is limited (e.g., to less than 30° less or to less than 50°), a full spherical lens may not be required. The ellipsoidal Luneburg lens 400 of FIG. 6 may provide a good compromise between the spherical Luneburg lens 50 of FIG. 2B and the flat Luneburg lens 100 of FIG. 3A in that it may be relatively small and light while still providing good performance over a desired range of scan angles.

It will be appreciated that pursuant to embodiments of the present invention the step approximation of an ellipsoidal Luneburg lens 400 shown in FIG. 6 may be fabricated using printed circuit boards that have meta-structures formed thereon in the manner discussed above with reference to FIGS. 4A-4D. The outer printed circuit boards may be smaller than the inner printed circuit boards to form a step approximation of an ellipsoidal Luneburg lens in example embodiments. In other embodiments, all of the printed circuit boards may have the same size, but the inner printed circuit boards may have more unit cells than the outer printed circuit boards in order to create the ellipsoidal lens (i.e., unit cells are omitted around the periphery in the outer printed circuit boards). In still other embodiments, the ellipsoidal Luneburg lens 400 of FIG. 6 may be fabricated using 3D printing techniques in a manner similar to the RF lens 300 described above, with the only difference being that the meta-structures are arranged to form a step approximation of an ellipsoidal Luneburg lens instead of a step approximation of a flat Luneburg lens. In these embodiments, the dielectric block may, for example, have an ellipsoidal shape.

Figure 7:
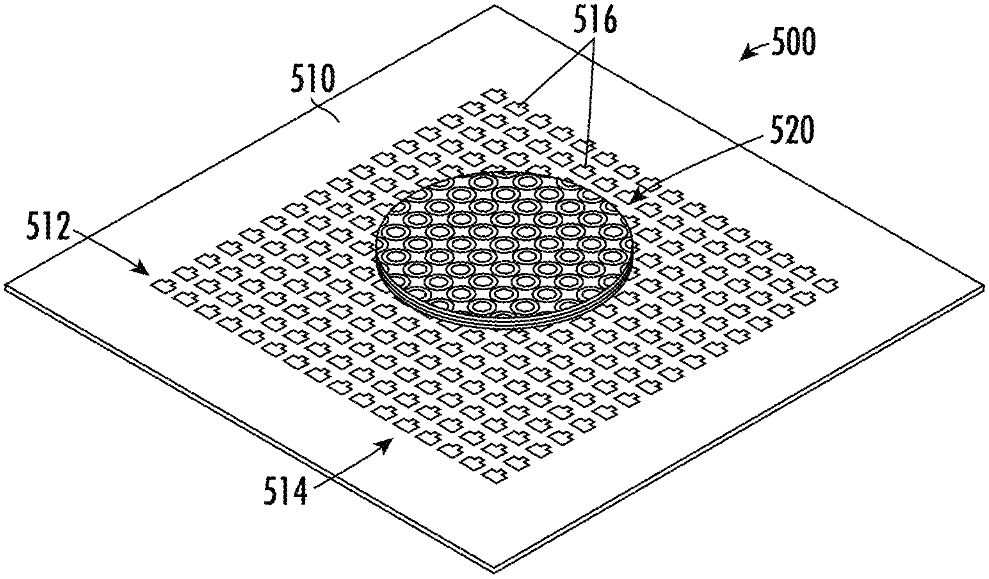
FIG. 7 is a schematic perspective view of an antenna that includes a multi-column, multi-row array of radiating elements and a Luneburg lens according to embodiments of the present invention.

FIG. 7 is a schematic perspective view of an antenna 500 that includes an array 510 of radiating elements 516 and a Luneburg lens 520 according to embodiments of the present invention.

As shown in FIG. 7, the array 510 includes a large number of radiating elements 516 that are arranged into rows 512 and columns 514. The array 510 may be coupled to a radio (not shown) that generates RF signals (cither a composite RF signal that is sub-divided into a plurality of sub-components, or a plurality of individually created sub-components) that is passed to the array 510. The array 510 is configured to transmit the sub-components of the RF signal into free space, and is also typically configured to focus the RF energy in desired directions. The Luneburg lens 520 is positioned in front of the array 510 so as to receive at least some of the RF energy emitted by the array 510 and, typically, to receive a large percentage of the RF energy emitted by the array 510. In the depicted embodiment, the Luneburg lens 520 has a "footprint" (i.e., the area of the lens 520 when viewed along an axis that extends through the center of the lens 520 and that is perpendicular to the front and back surfaces of the lens 520) that is substantially smaller than the footprint of the array 510 (i.e., the area of the array 510 when viewed along an axis that extends through the center of the array 510 and that is perpendicular to the plane defined by the rows 512 and columns 514 of radiating elements 516 of the array 510).

In some embodiments, the array 510 may have a relatively large number of radiating elements 516, and may be configured so that amplitudes and phases of the sub-components of an RF signal that are fed to the radiating elements 516 may be individually controlled. In such embodiments, a relatively large percentage of the RF energy emitted by the array 510 may be directed into the Luneburg lens 520, even though the Luneburg lens 520 may have a footprint that is smaller than the footprint of the array 510, or even substantially smaller than the footprint of the array 510, as the sub-components of the RF signal may be phased to electronically steer the RF energy in the direction of the lens 520. In example embodiments, the footprint of the Luneburg lens 520 may be less than two-thirds the footprint of the array 510, less than one-half the footprint of the array 510, or even less than one-third the footprint of the array 510.

It will be appreciated that the present specification only describes a few example embodiments of the present invention and that the techniques described herein have applicability beyond the example embodiments described above.

Embodiments of the present invention have been described above with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "on" another element, it can be directly on the other element or intervening elements may also be present. In contrast, when an element is referred to as being "directly on" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, operations, elements, and/or components, but do not preclude the presence or addition of one or more other features, operations, elements, components, and/or groups thereof.

Aspects and elements of all of the embodiments disclosed above can be combined in any way and/or combination with aspects or elements of other embodiments to provide a plurality of additional embodiments.

The invention claimed is:

1. A radio frequency ("RF") lens, comprising:

a multilayer printed circuit board that comprises a plurality of dielectric layers and a plurality of metallization layers that are alternatingly stacked, the plurality of metallization layers including at least a first metallization layer and a second metallization layer, wherein each metallization layer comprises a plurality of meta-structures, and wherein the meta-structures are arranged to form a step approximation of a Luneburg lens in at least one direction.

2. The RF lens of claim 1, wherein the RF lens is a step approximation of a Luneburg lens in each of three orthogonal directions.

3. The RF lens of claim 1, wherein the meta-structures included in the first metallization layer all have the same shape.

4. The RF lens of claim 1, wherein at least some of the meta-structures included in the first metallization layer have different sizes than other of the meta-structures included in the first metallization layer.

5. The RF lens of claim 4, wherein the first metallization layer is an interior one of the plurality of metallization layers.

6. The RF lens of claim 1, wherein a metallization layer of the plurality of metallization layers that is closest to being in the middle of the alternating stacked plurality of dielectric layers and plurality of metallization layers includes a meta-structure that is at least as large as any of the meta-structures included in the plurality of metallization layers.

7. The RF lens of claim 1, wherein outer ones of the metallization layers in the plurality of metallization layers include meta-structures that are at least as small as any of the meta-structures included in the plurality of metallization layers.

8. The RF lens of claim 1, wherein the first metallization layer is an interior one of the plurality of metallization layers, and wherein meta-structures extending around the periphery of the first metallization layer are smaller than meta-structures in a center of the first metallization layer.

9. The RF lens of claim 1, wherein each meta-structure has a closed perimeter.

10. The RF lens of claim 1, wherein each meta-structure has an open interior.

11. The RF lens of claim 1, wherein the step approximation is at least a three step approximation.

12. The RF lens of claim 1, wherein each metallization layer in the plurality of metallization layers includes a plurality of unit cells, and each unit cell in each metallization layer is spaced apart from adjacent unit cells in the respective metallization layers by a same distance.

13. An antenna, comprising, an array that includes a plurality of radiating elements that are configured to transmit respective sub-components of a first RF signal;

the lens according to claim 1 positioned to receive electromagnetic radiation from at least some of the radiating elements in the array.

14. An antenna, comprising:

a two-dimensional array that includes at least two rows of radiating elements and at least two columns of radiating elements; and a flat Luneburg lens positioned forwardly of the two-dimensional array and configured to receive radio frequency ("RF") radiation emitted by the two-dimensional array, wherein the flat Luneburg lens only overlaps a central portion of the two-dimensional array.

15. The antenna of claim 14, wherein the flat Luneburg lens only overlaps less than two-thirds of the radiating elements in the two-dimensional array.

16. The antenna of claim 14, wherein the flat Luneburg lens only overlaps less than one-third of the radiating elements in the two-dimensional array.

17. The antenna of claim 14, wherein the flat Luneburg lens comprises:

a multilayer printed circuit board that includes a plurality of dielectric layers and a plurality of metallization layers that are alternatingly stacked, the plurality of metallization layers including at least a first metallization layer and a second metallization layer, wherein each metallization layer comprises a plurality of meta-structures, and the meta-structures are arranged to form a step approximation of a Luneburg lens in at least one direction.

18. The antenna of claim 17, wherein the flat Luneburg lens is a step approximation of a Luneburg lens in each of three orthogonal directions.

19. The antenna of claim 18, wherein the meta-structures included in the first metallization layer all have the same shape and at least some of the meta-structures included in the first metallization layer have different sizes than other of the meta-structures included in the first metallization layer.

20. The antenna of claim 18, wherein each metallization layer in the plurality of metallization layers includes a plurality of unit cells, and each unit cell in each metallization layer is spaced apart from adjacent unit cells in the respective metallization layers by a same distance.

* * * * *